July 12, 1938. C. DOERING 2,123,596
DISCHARGE DEVICE FOR CHILLING MACHINES AND THE LIKE
Filed Oct. 12, 1936 3 Sheets-Sheet 1

Inventor
Charles Doering
BY
Harry C. Hewitt
Attorney.

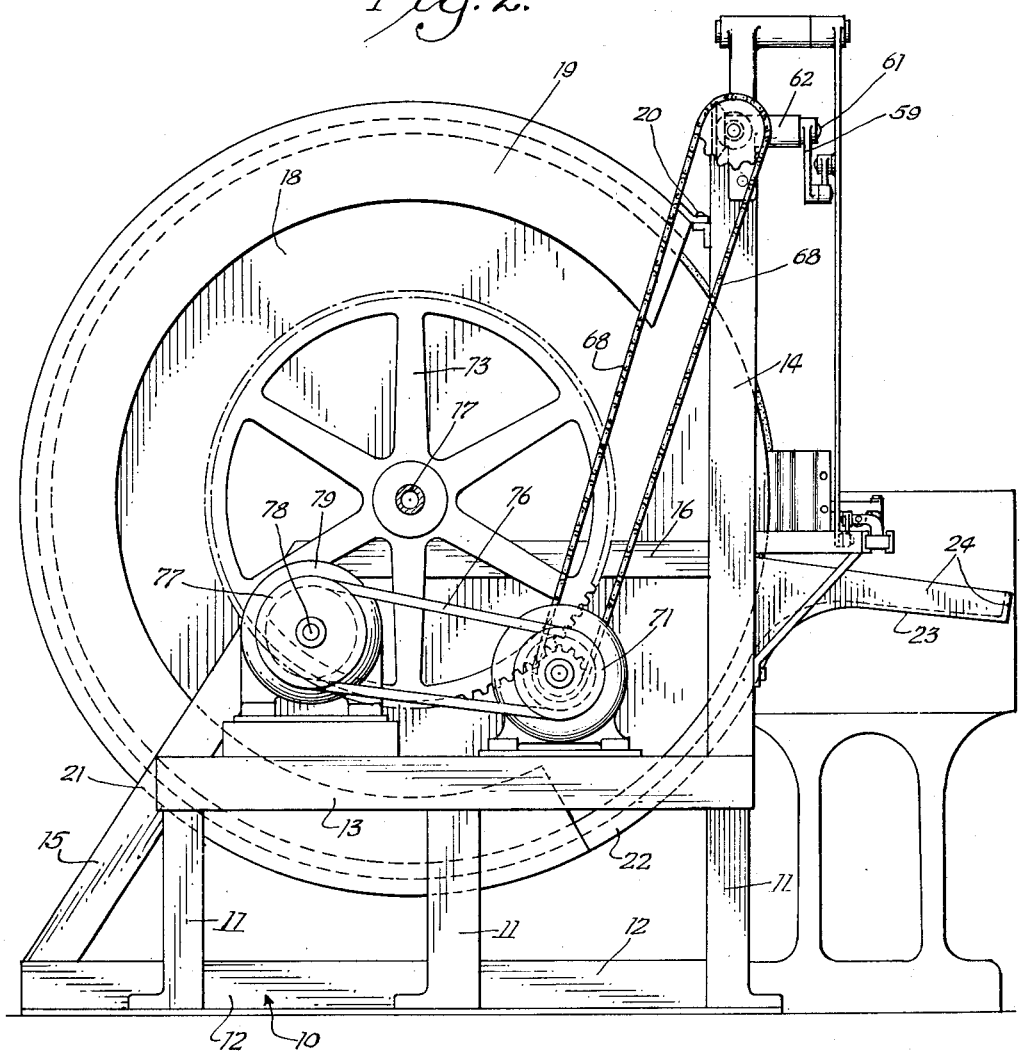

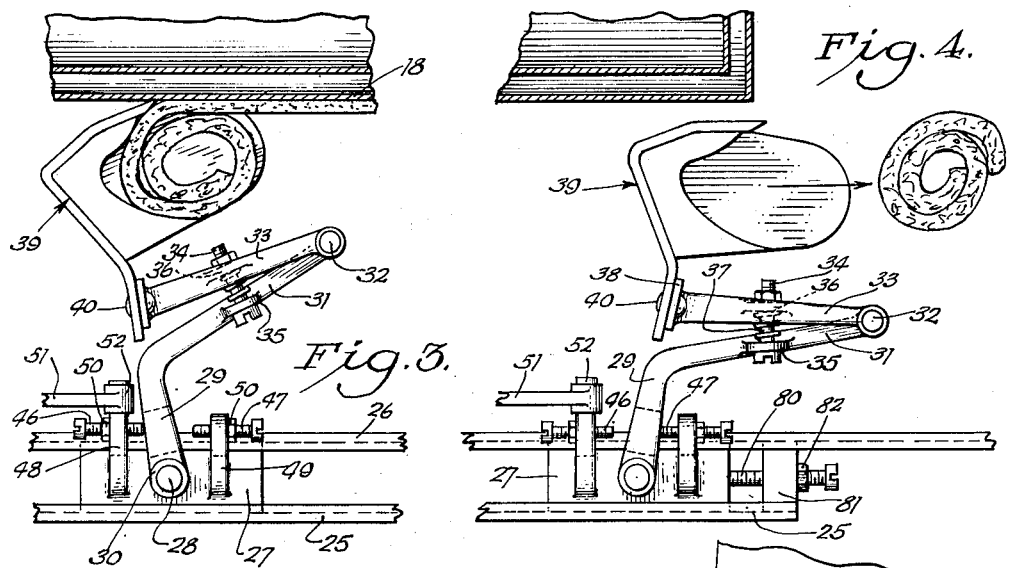

Patented July 12, 1938

2,123,596

UNITED STATES PATENT OFFICE 2,123,596

DISCHARGE DEVICE FOR CHILLING MACHINES AND THE LIKE

Charles Doering, Chicago, Ill., assignor of one-half to Henry Doering, Chicago, Ill.

Application October 12, 1936, Serial No. 105,263

9 Claims. (Cl. 62—114)

This invention relates to chilling machines and more particularly to means for removing substances from refrigerated surfaces and the like, although certain features thereof may be employed with equal advantage for other purposes.

It contemplates more especially the provision of improved discharge or scraper means for removing edible substances from refrigerated or other surfaces after treatment to impart keeping qualities and/or effect the conversion thereof into a more useful form or consistency.

It has heretofore been the practice of removing substances by resort to a stationary scraper blade in frictional contact with a relatively moving surface. This expedient requires adjustment owing to wear and variations in the edible treatment which is momentary so that discharge of frozen substances must be effected in timed relation therewith. Further, discharge of the devices with a stationary scraper blade requires a conveyor or other moving instrumentalities to effect the placement of the removed substances from their position of discharge.

With the teachings of the instant invention, the discharge device effects the removal and displacement of the substances in a single operation, and substantially increased production results. No discharge conveyor mechanism is necessary as embodied in my copending application serially numbered 100,505 and filed September 12, 1936 wherein separate conveyors are utilized to feed the substances along a predetermined path and to effect their discharge to any desired position for further processing. Consequently, production is increased and numerous moving parts and power instrumentalities are dispensed with, thereby acquiring more dependability in operation and reducing the cost of machine construction, operation and maintenance. Greater uniformity and better control are also insured with a transfer pan that is temperature regulated to expedite feeding of any particular substances and thus provides flexibility in its adaption to many different types of substances.

One object of the present invention is to provide improved discharge means for removing edible substances from a predetermined path of travel for further treatment.

Another object is to provide improved means for effecting the removal of edible products from a predetermined path to effect their displacement for further treatment.

Still another object is to provide discharge means for transferring substances from a refrigerated surface for further treatment or handling.

A further object is to provide improved instrumentalities for transferring edible substance from refrigerated surfaces to effect the removal thereof after conversion into a substantially solid state.

A still further object is the provision of improved scraper means for a chilling machine to effect the delivery of treated substances therefrom.

Still a further object is the provision of improved means for effectively removing solidified substances from a chilling surface without entailing any appreciable time, labor and effecting their accumulation into a uniformly blended and homogeneously solidified mass for further treatment.

An additional object is to provide an improved substance removing and displacing device in combination with a substance treating surface.

Still an additional object is to provide an improved surface scraper mechanism for displacing substances therefrom.

Other objects and advantages will appear from the following description of an illustrative embodiment of the present invention.

In the drawings:

Figure 2 is an end view in elevation of the device shown in Figure 1.

Figure 3 is a fragmentary detail plan view of a scraper device embodying features of the present invention, parts thereof being broken away to clarify the showing.

Figure 4 is a view similar to Figure 3 with the scraper mechanism shown in an advanced position of operation.

Figure 5 is a fragmentary side view taken from line V—V of Figure 1, and

Figure 6 is a perspective view of the scraper shown in Figures 3, 4 and 5.

Figure 1:
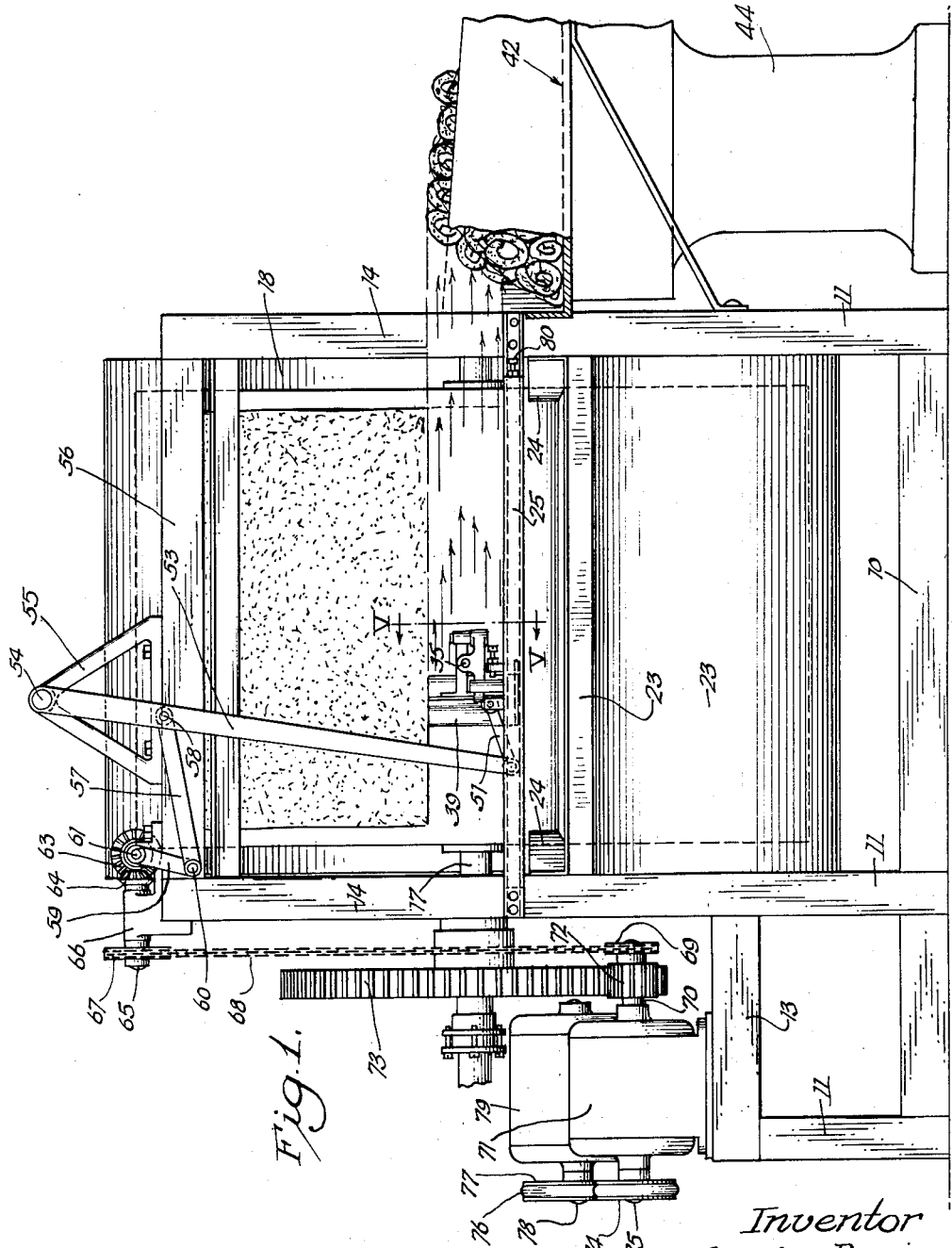
Figure 1 is a front view in elevation of a device embodying features of the present invention, parts thereof being shown in section to clarify the showing.

The structure selected for illustration comprises a frame base 10 from which extend vertical beams 11 that are in spaced parallelism for rigid spaced support by horizontal cross members 12 that support a platform 13 serving as a part of the frame structure to constitute an instrumentality support as will appear more fully hereinafter. Forward vertical standards 14 and rearward inclined standards 15 support elevated beam members 16 which are provided with split bearings for journalled support of a shaft 17. The shaft 17 carries a comparatively large cylindrical member such as a closed-end drum 18 that is fixed thereto for rotation therewith between the horizontal beam members 16.

The drum 18 defines a large circumferential surface that is refrigerated in any suitable manner as commercial practice may dictate or as more fully disclosed and described in my copending application Serial Number 100,505 and filed September 12, 1936. It is to be noted that the refrigerated peripheral surface of the external drum 18 extends throughout the surface extent thereof to provide the greatest refrigeration capacity. The sides of the external drum 18 are preferably provided with sheets of insulation material so as to direct, concentrate and transmit cold from the refrigerant passing through the drum 18 and against the interior peripheral surface thereof so that the substances to be chilled will contact the exterior thereof to instantaneously impart a chilling temperature thereto and effect the solidification or refrigeration thereof in successive increments as the drum 18 rotates relative to a charging mechanism for feeding edible substances thereto in a continuity of operations. The drum 18 is preferably provided with an external enclosure or casing 19 that conforms in shape therewith and is supported thereover by attachment as at 20 and 21 to the forward standards 14 and the rearward inclined standards 15.

The substances are supplied to the external peripheral surface of the refrigerated drum 18 in a uniform layer of any desired thickness by means of a transfer device or pan 22 which is disposed a short distance below the surface of the drum 18 and conforms in curvature thereto so as to define the path of travel for the edible substances for gradual adhesion to the refrigerated surface of the drum 18 that rotates in a clockwise direction (viewed from Figure 2) relative thereto. To this end, the transfer device 22 is pivotally supported beneath the drum 18 in a manner more clearly shown and described in my copending application Serial Number 100,505, filed September 12, 1936. The transfer pan 22 extends arcuately forwardly to substantially conform in curvature to the lower region of the drum 18 between the forward standards 14 and rearward 15 of the frame 10. The pan 22 is preferably chambered for its entire arcuate extent to receive a tempering fluid therethrough as is more fully shown in the above referred to companion application, and terminates forwardly beyond the frame standards 14 in a substantially horizontally extending solid flat portion 23 having an upstanding peripheral flange 24 along the sides and forward edge thereof to receive and confine the edible substances thereon. The edible substances are placed upon the flat solid forward extension 23 of the transfer pan 22 for manual displacement to the arcuate portion thereof which extends rearwardly for a distance sufficient to insure that a uniform layer of the substance will adhere to the periphery of the drum by virtue of its refrigeration sufficient to give instantaneous chilling adhesion of the substance thereto.

In order to remove the chilled or solidified substances from the surface or periphery of the drum 18, a scraping mechanism is provided to cooperate with the drum surface and remove as well as displace the substances therefrom. To this end, the forward standards 14 are provided with confronting tracks 25 and 26 (Figures 1 and 5) that bridge the forward standards 14 tangentially of the drum surface 18. The confronting tracks 25—26 are suitably spaced to receive a correspondingly sized carrier 27 therebetween for reciprocal displacement in a manner which will appear more fully hereinafter.

As shown, the carrier 27 has a trunnion 28 extending vertically therefrom to rotatively receive a short lever arm 29 having a bearing 30 complemental to the trunnion 28. The short arm 29 has an offset long arm 31 which is pivotally connected as at 32 to a lever arm 33 which is substantially of the same length as the long opposite arm 31 so that both pivot about or relative to the trunnion 28. The lever arms 31 and 33 are resiliently connected by means of a carriage bolt 34 which projects through confronting apertured webs 35 and 36 formed integrally in the lever arms 31 and 33, respectively.

A coil spring 37 envelops the bolt 34 between the lever arm webs 35 and 36 to limit their pivotal approach and serve as a buffer between the lever arms 31 and 33. Any suitable scraper device may be attached to the extremity of the lever arm 33 which terminates in an enlarged flange 38 to enable the attachment thereof to a scraper instrumentality 39 through the medium of any suitable fasteners 40. The scraper instrumentality 39 is preferably, though not essentially, constructed from a metallic plate which is pressed or otherwise shaped to define an angular outline presenting a scraping edge 41 that is preferably of slightly arcuate configuration and tapered to present a sharp edge conforming to the circumferential curvature of the periphery of the drum 18 (Figures 5 and 6).

In consequence thereof, the sharp scraping edge 41 will be in frictional contact with the periphery of the drum 18 for the entire scraper edge extent of the former to effectively remove the chilled substances in its operative stroke toward the right (viewed from Figure 1) and effect the displacement thereof to a tray 42 fixed to the frame 10 in the path of the scraper 39. The interior surface of the scraper instrumentality 39 is preferably shaped and defined by an insert 43 having the desired form and curvature to spirally wind the chilled substances into a compact mass as it is removed from the periphery of the refrigerated drum 18.

In the present embodiment, the insert 43 is preferably constructed from maple wood that does not readily absorb any oils or fats from edible substances nor impart any undesirable odor or flavor thereto. The insert 43 is preferably curved to present confronting curved surfaces that progressively coil the substances into a compact mass (see Figures 3 and 4) commensurate with the displacement thereof to the right in contact with the periphery of the drum 18. This progressive coiling of the chilled substances defines a dense body that even more effectively enables the cold to permeate therethrough while it is being removed from the refrigerated drum 18.

Then, too, the progressive coiling of the removed substances into dense unitary masses affords the displacement thereof with speed and accuracy for discharge to the tray 42 which has an opening in the supporting surface thereof for communication with the hopper of any other suitable treating machine such as a butter print machine 44 disposed therebelow (Figure 1). In order to preclude the removed substances that are progressively coiled by the scraper instrumentality 39 from falling therebelow, a horizontal plate 45 extends from the bottom edge of the scraper instrumentality 39 so as to sustain the removed substances as such is progressively coiled into a dense mass for displacement responsive to the linear movement of the scraper instrumentality 39 in a manner which will appear more fully hereinafter.

The pivotal movement of the lever arm 29 that sustains the scraper instrumentality 39 is controlled by adjustable studs 46 and 47 that threadedly project through confronting lugs 48 and 49, respectively, integrally or otherwise attached to the carrier block 27. Lock nuts 50 are provided on the limit stops 46 and 47 to maintain such in adjusted position for any particular throw or stroke of the lever arm 29. In order to impart reciprocatory movement to the carrier block 27, a link 51 is pivotally connected to the lug 48 at one extremity 52 thereof while the other extremity is pivotally connected to a link bar 53 that is pivotally anchored as at 54 to a bracket 55 attached to and supported by a cross-member 56 fixed to the top extremities of the forward standards 14 (Figure 1).

Oscillatory movement is imparted to the link bar 53 by means of a link 57 pivotally connected as at 58 with a crank arm pivotally connected as at 60 to the other extremity thereof to convert rotation of the crank arm 59 into oscillatory movement of links 57 and its connecting link bar 53 that reciprocates the carrier block 27 with its scraping instrumentality 39 for substantially the entire width of the drum 18. Rotation of the crank arm 59 is effected by means of a shaft 60 journalled in a bearing 62 (Figure 2) for connection to a bevel gear 63. The bevel gear 63 is in meshing engagement with a bevel pinion 64 fixed to a shaft 65 journalled in a bearing 66 (Figure 1) for operative connection to a sprocket 67.

The sprocket 67 has a chain 68 in meshing engagement therewith for imparting linear movement thereto and rotation of the bevel pinion 64 owing to a sprocket 69 fixed to a shaft 70 projecting from a speed reducer 71 supported on the platform 13 (Figure 1). The shaft 70 also carries a pinion 72 that is in meshing engagement with a spur gear 73 fixed to the shaft 17 that carries the drum 18. A pulley 74 is carried by the drive shaft 75 constituting a part of the speed reducer 71 so that a belt 76 will traverse thereover to engage the pulley 77 fixed to the armature shaft 78 of an electric motor 79. In consequence thereof all of the moving instrumentalities are operated from a single power source which is the electric motor 79 that imparts rotation to the drum 18 and effects the reciprocation of the scraper instrumentality 39.

The scraper instrumentality 39 may be of any desired vertical width depending upon the chilling capacity and the surface extent of the drum 18 and, further, the speed of rotation is also a factor of the desired scraping capacity and substance displacement after it has been chilled. In the operative directional movement of the scraper instrumentality 39 which is toward the right (viewed from Figure 1), the lever arm 29 is sustained by the limit stop 46 and the spring 37 interposed between the levers 31 and 33 effects frictional engagement of the sharp scraping edge 41 with the periphery of the drum until the carrier block 27 reaches the limit of its movement determined by an adjustable stop comprising, in this instance, a threaded stud 80 mounted in a lug 81 carried by the track 25 at its extreme right extremity (Figure 4).

A lock nut 82 is provided on the stud 80 to preclude the accidental movement thereof and to maintain such in its adjusted position. When the carrier block 27 reverses its movement and starts toward the left (viewed from Figure 4) the lever arm 29 will engage the other stop 47 owing to the frictional engagement of the scraper instrumentality 39 with the periphery of the drum 18, and in this position will be removed from the drum surface almost immediately upon initiating return movement. When the carrier block 27 is again reversed to move toward the right the engagement of the scraping edge with the drum periphery will displace the lever arm 29 for support by the stop 46, thereby maintaining the scraping edge 41 against the surface of the drum 18 for the entire stroke toward the right during which the chilled substances are removed and progressively coiled into a dense cylindrical mass for ejection to the tray 42 fixed to the frame 10 in the path of the removed or discharged substances.

It is worthy of note that the configuration and shape of the scraper instrumentality 39 and/or its insert 43 may be varied within a wide range depending upon the type of edible substances that are being chilled and the curvature necessary to progressively coil different substances into a dense cylindrical mass that is ejected at high speed from the scraper instrumentality 39 (Figure 4) in the direction of the tray 42 that serves as a receptacle or receiving station therefor. By resort to these scraping instrumentalities, the capacity of a chilling machine is greatly enlarged and greatly increased production results in consequence thereof.

Actual production operations teach that the progressive coiling of the chilled substances simultaneous with its removal even more effectively refrigerates the substances as it is removed from the drum 18, and is responsible for greater lowering of the temperature of the mass as such is delivered to the receptacle or receiving station 42 for further treatment or packaging. In the present embodiment the butter print machine or other device is disposed below the receptacle 42 which communicates therewith to directly receive the chilled substances therefrom for conversion into units, butter prints or packaging as commercial practive may dictate.

Various changes may be made in the embodiment of the invention herein specifically described without departing from or sacrificing any of the advantages of the invention or any features thereof, and nothing herein shall be construed as limitations upon the invention, its concept or structural embodiment except as defined in the appended claims.

I claim:—

1. In a device of the character described, the combination with a refrigerated external drum surface, of means for rotating said drum surface, and reciprocatory means for removing the chilled substances from said external drum surface.

2. In a device of the character described, the combination with a refrigerated external drum surface, of means for rotating said drum surface, and scraper reciprocatory means for removing the chilled substances from said external drum surface.

3. In a device of the character described, the combination with a refrigerated external drum surface, of means for rotating said drum surface, and scraper reciprocatory means for removing and simultaneously coiling the chilled substances from said external drum surface.

4. In a device of the character described, the combination with a refrigerated drum, of means for rotating said drum, and scraper reciprocatory means for removing and simultaneously coiling the chilled substances from said drum, said scraper means being pivoted to eject the coiled substances to a tray in the path of said scraper means.

5. In a device of the character described, the combination with a refrigerated drum, of means for rotating said drum, a carriage mounted for reciprocation along the length of said drum, and a scraper means resiliently mounted on said carriage to remove the chilled substances from said drum.

6. In a device of the character described, the combination with a refrigerated drum, of means for rotating said drum, a carriage mounted for reciprocation along the length of said drum, and a scraper means pivotally mounted on said carriage to remove and eject the chilled substances from said drum.

7. In a device of the character described, the combination with a refrigerated drum, of means for rotating said drum, a carriage mounted for reciprocation along the length of said drum, a scraper means pivotally mounted on said carriage to remove and eject the chilled substances in coiled form from said drum, and spring means for urging said scraper means in engagement with said drum.

8. In a device of the character described, the combination with a refrigerated drum, of means for rotating said drum, a carriage mounted for reciprocation along the length of said drum, a scraper means pivotally mounted on said carriage to remove and eject the chilled substances from said drum, and spring means for urging said scraper means in engagement with said drum, said scraper means being arcuate in configuration to coil the chilled substances into a dense cylindrical mass during the ejection thereof from said drum.

9. In a device of the character described, the combination with a refrigerated drum, of means for rotating said drum, a carriage mounted for reciprocation along the length of said drum, a scraper means pivotally mounted on said carriage to remove and eject the chilled substances from said drum, spring means for urging said scraper means in engagement with said drum, said scraper means being arcuate in configuration to coil the chilled substances into a dense cylindrical mass during the ejection thereof from said drum, and limit stops in the pivotal path of said scraper means to provide an operative and inoperative stroke with each complete reciprocation.

CHARLES DOERING.